US008269145B2

(12) United States Patent
Blanc et al.

(10) Patent No.: US 8,269,145 B2
(45) Date of Patent: Sep. 18, 2012

(54) METHOD FOR OPERATING A HEATING ELEMENT IN A MOTOR VEHICLE BY PULSE WIDTH MODULATION

(75) Inventors: Martin Blanc, Knittlingen (DE); Andreas Bleil, Ludwigsburg (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 218 days.

(21) Appl. No.: 12/881,672

(22) Filed: Sep. 14, 2010

(65) Prior Publication Data

US 2011/0062138 A1 Mar. 17, 2011

(30) Foreign Application Priority Data

Sep. 16, 2009 (DE) ........................ 10 2009 041 749

(51) Int. Cl.
*B60L 1/02* (2006.01)
*G06F 19/00* (2011.01)

(52) U.S. Cl. ........ 219/202; 219/260; 219/482; 219/483; 219/490; 219/492; 219/497; 219/544; 219/494; 701/102; 701/106; 701/113; 701/115; 123/145 A; 123/145 R; 123/605; 123/179.21; 123/179.6; 73/114.62; 361/264; 361/265; 361/266

(58) Field of Classification Search .................. 219/202, 219/260, 482–3, 490–92, 497, 494, 544; 701/102, 106, 113, 115; 123/145 A, 145 R, 123/605, 179.21, 179.6; 73/114.62; 361/264–66; 700/300
See application file for complete search history.

(56) References Cited

U.S. PATENT DOCUMENTS

2009/0183718 A1 7/2009 Casasso et al.
2009/0326785 A1 12/2009 Colet et al.
2010/0094523 A1 4/2010 Kernwein et al.

FOREIGN PATENT DOCUMENTS

DE 10 2008 007 397 A1 8/2009
DE 10 2009 002 063 A1 10/2009

*Primary Examiner* — Shawntina Fuqua

(57) ABSTRACT

The invention relates to a method for operating a heating element in a motor vehicle by pulse width modulation, wherein fluctuations in the supply voltage are compensated for by adapting the duty cycle so as to achieve a desired heating output. According to the invention, during a voltage pulse the voltage that is present at the heating element and/or the current flowing through the heating element are measured at specified intervals, and the measured values or values determined therefrom are added to calculate a sum value, which rises with the energy that is fed into the heating element by the voltage pulse, and the voltage pulse is ended at the latest when the sum value has reached a target value. The invention furthermore relates to a glow plug controller for carrying out the method according to the invention.

13 Claims, 2 Drawing Sheets

METHOD FOR OPERATING A HEATING ELEMENT IN A MOTOR VEHICLE BY PULSE WIDTH MODULATION

The invention relates to a method for operating a heating element in a motor vehicle by pulse width modulation, wherein fluctuations in the supply voltage are compensated for by adapting the duty cycle so as to achieve a desired heating output.

Such a method is described in DE 10 2006 010 081 A1. In the known method, the energy to be fed into a glow plug during a period with a voltage pulse is established as a function of a desired target temperature of the glow plug, and a corresponding pulse duration is specified while taking the current supply voltage for the current period into consideration. By measuring the current and voltage, the actual heating energy that is introduced during the voltage pulse is then determined, and an energy deficit or an energy surplus is compensated for during one of the subsequent periods.

The known method can be used to regulate the temperature of a glow plug to an operating temperature which enables optimal ignition behavior. By feeding the energy that is required to maintain a desired operating temperature into a glow plug by way of pulse width modulation on a time average, a drop in the temperature, which would result in worse ignition behavior, and also overheating, which would result in premature failure of the glow plug, can be counteracted.

It is the object of the invention to identify a way as to how the control of glow plugs can be further improved in order to combine an optimal ignition behavior of a diesel engine with the longest possible service life of the glow plugs.

SUMMARY OF THE INVENTION

A method according to the invention prevents a rise in the supply voltage during a voltage pulse from resulting in overheating of the heating element. According to the invention, the energy that is fed during a voltage pulse is approximately determined and monitored, so that a voltage pulse can be shortened if a rise in the supply voltage occurs. The impact of fluctuations of the vehicle electrical system voltage on the temperature of the heating element can advantageously be reduced in this way. Advantageously, a method according to the invention can thus increase the service life of a glow plug, without impairing the ignition behavior of a diesel engine.

In a method according to the invention, during a voltage pulse a sum value is determined, which rises as a result of the energy that is fed into the heating element by the voltage pulse. The sum value allows an approximate conclusion of the energy that is fed into the heating element by the voltage pulse. In order to determine the sum value, the voltage that is present at the heating element and/or the current flowing through the heating element are measured continuously, and the measured values or values determined therefrom are added. The voltage pulse is terminated at the latest when the sum value has reached a target value, which can be specified by a controller as a function of the quantity of the desired heating output.

The energy that is fed during a voltage pulse is defined by the integral of the product formed of the voltage that is present at the heating element and the current flowing through the heating element over the duration of the pulse. For the energy E that is introduced during a pulse therefore $E=\int U\cdot I$ applies, where U is the voltage that is present at the heating element and I is the current flowing through the heating element. The beginning of the voltage pulse and the end of the voltage pulse are selected as the integration limits of this integral.

This integral, and thus the energy that is fed, can be approximated by a sum value, wherein the product formed of the current and voltage is calculated for a series of points in time and added. By assuming the electric resistance of a heating element to be approximately constant during a voltage pulse, the energy that is fed into the heating element during a voltage pulse can also be approximately determined based on a series of measured values of the voltage that is present at the heating element, or a series of measured values of the current flowing through the heating element, in that the squares of the measured values of such a series are added. A somewhat less precise, yet for practical purposes still sufficient approximation for the energy that is fed into the heating element during a voltage pulse is to determine a series of measured values of the voltage that is present at the heating element and to add the individual voltage values, or to determine a series of the current flowing through the heating element and to add the individual current values.

In a method according to the invention, a voltage pulse is preferably not ended until the sum value has reached the target value. In this way, it is possible to precisely end a voltage pulse when the energy that is fed into the heating element approximately corresponds to a target value.

Because a glow plug overheating is generally considerably more harmful than an operating temperature that is slightly too low, the method according to the invention can advantageously also be used in that a controller specifies both a target value for the sum value and a maximum pulse duration for the individual pulses and a pulse is ended as soon as either the sum value has reached the target value or the maximum pulse duration has been reached. In this procedure, it is accepted that a voltage pulse may feed less than the desired energy quantity into the heating element. Any possible deficit can be compensated for by the subsequent voltage pulse, so that potential cooling of the heating element is generally short-lived.

In a method according to the invention, measurements are preferably carried out, this meaning that the voltage that is present at the heating element and/or the current flowing through the heating element are measured, during a pulse at least twice, preferably at least four times, per millisecond. During a voltage pulse, preferably at least ten measurements are carried out, with at least 20 times being particularly preferred, and at least 50 times being most preferred. This means that the sum value is calculated by adding preferably at least 10, particularly preferably at least 20, and most preferably at least 50 summands.

By continuously measuring the voltage that is present at the heating element, a series of voltage values can be generated. By continuously measuring the current flowing through the heating element, a series of current values can be generated. The voltage values can be generated for the same points in time as the current values, however this is not absolutely necessary. In order to calculate the sum value, the product can be formed of a voltage value and the current value that is temporally closest thereto.

BRIEF DESCRIPTION OF THE DRAWINGS

The invention further relates to a glow plug controller, which is equipped to carry out the method according to the invention.

Further details and advantages of the invention will be described based on an exemplary embodiment with reference to the attached drawings. Shown are.

DETAILED DESCRIPTION

Figure 1:
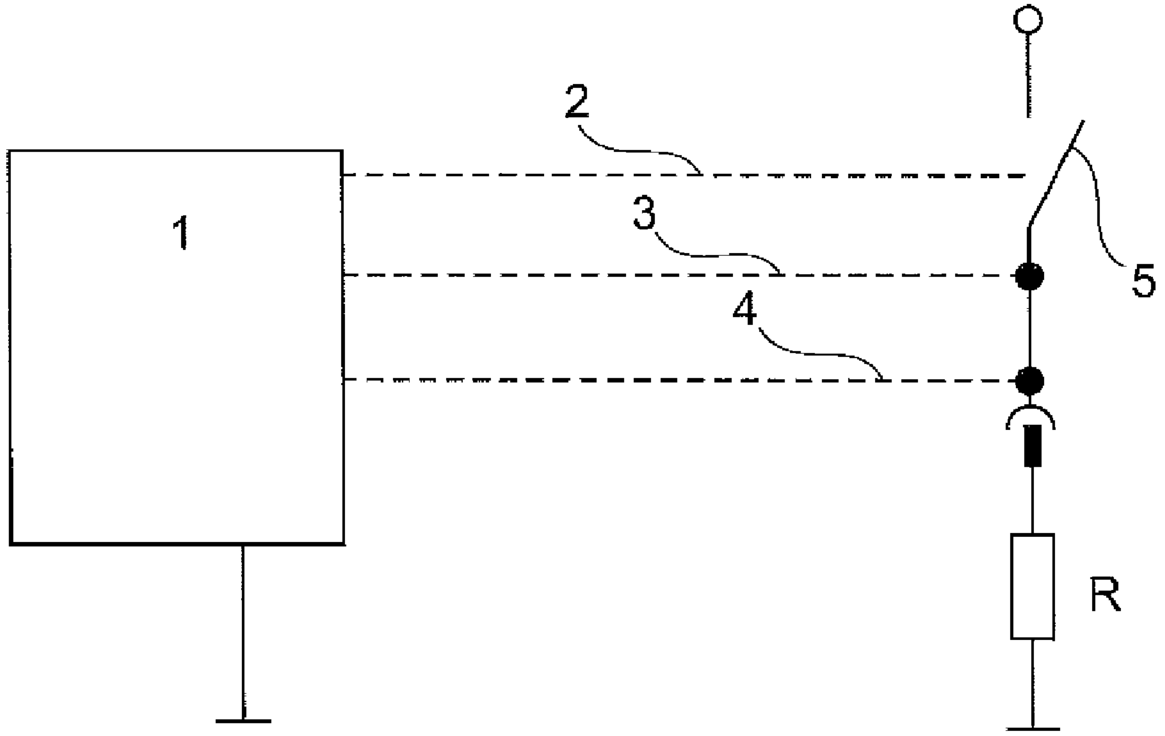
FIG. 1 a schematic illustration of a controller and a glow plug connected to the vehicle electrical system of a vehicle by way of a switch.

FIG. 1 is a schematic illustration of the heating resistor R of a glow plug, which is connected to the vehicle electrical system of a motor vehicle by way of a switch 5. The switch 5 is actuated by a glow plug controller 1, which can be configured as a microcontroller or microprocessor, for example. The switch 5 is a semiconductor power switch, preferably a field effect transistor, such as a MOSFET. The switch 5 is connected to the glow plug controller 1 by way of a control line 2. The glow plug controller 1 measures the current flowing through the heating element R. A corresponding current signal is made available to the glow plug controller 1 by way of the signal line 3. The glow plug controller 1 also measures the voltage that is present at the heating element R. A corresponding voltage signal is made available to the glow plug controller 1 by way of the signal line 4. Both the heating element R of the glow plug and the glow plug controller 1 are connected to ground by appropriate lines.

Figure 2:
FIG. 2 an example of the curve of the vehicle electrical system voltage.

The vehicle electrical system voltage of a motor vehicle, and thus the supply voltage of the heating element, are typically subject to considerable fluctuations. FIG. 2 is a schematic illustration of an example of the curve of the vehicle electrical system voltage U as a function of the time t. If at the point in time $t_1$ the switch 5 is closed, current begins to flow through the heating element R. The glow plug controller 1 continuously measures the intensity of the current I flowing through the heating element R, thereby generating a series of measurement values $I(t_1)$, $I(t_2)$ to $I(t_n)$ of the current I.

Figure 3:
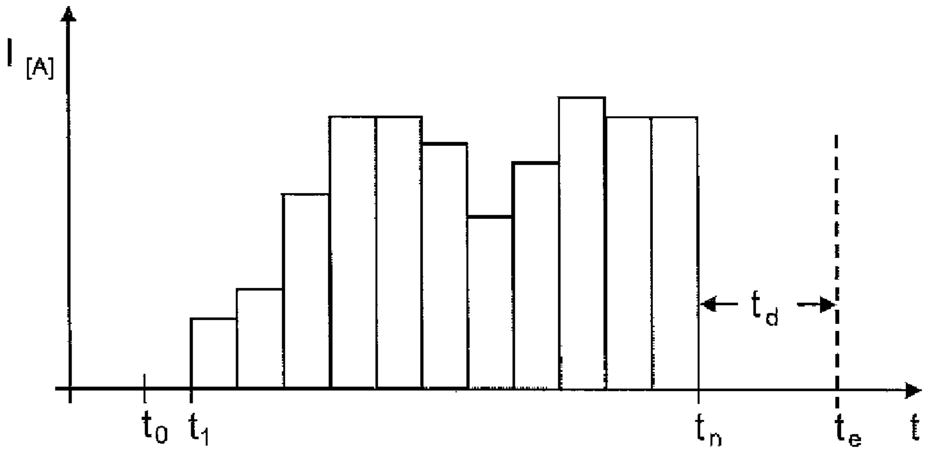
FIG. 3 an example of measured values of the current intensity for the voltage curve illustrated in FIG. 1.

FIG. 3 is a schematic illustration of an example of such a series of current values $I(t_1)$, $I(t_2)$ to $I(t_n)$ for the curve of the vehicle electrical system voltage shown in FIG. 2. The current values, as shown in FIG. 3, are preferably measured equidistantly, this being at constant time intervals Δt. The measured values can be filtered or statically processed before further evaluation.

During a voltage pulse, the glow plug controller 1 also measures the voltage that is present at the heating element, thus generating a series of voltage values $U(t_1)$, $U(t_2)$ to $U(t_n)$. The curve of the measured voltage values in principle agrees with the curve of the current values illustrated in FIG. 3, because current and voltage are linked by Ohm's law.

From the continuously measured voltage and current values, the glow plug controller 1 determines a sum value, which approximately indicates the energy that is fed into the heating element R by the voltage pulse. From a series of current values $I(t_1)$, $I(t_2)$ to $I(t_n)$ measured at points in time $t_1$ to $t_n$ and a corresponding series of voltage values $U(t_1)$, $U(t_2)$ to $U(t_n)$, a sum value S can be calculated, for example, as $$S = \Delta t \sum_{i=1}^{n} U(t_i) \cdot I(t_i)$$

where n is an integer, which indicates the number of measured current and voltage values present in the series, and Δt is the time delay between consecutive points in time. Because Δt is a constant that is known to the controller, it can be ignored in the calculation of the sum value and instead be taken into account in setting the target value.

As an alternative, a sum value, which approximately indicates the energy that is fed until the point in time $t_n$, can be calculated, for example, proportional to $$\sum_{i=1}^{n} I^2(t_i),\ \sum_{i=1}^{n} I(t_i),\ \sum_{i=1}^{n} U^2(t_i) \text{ or } \sum_{i=1}^{n} U(t_i).$$

Figure 4:
FIG. 4 the development of a sum value, which is calculated from the current values illustrated in FIG. 3.

FIG. 4 shows the curve the sum value S produced by the summation of the product formed of the current and voltage values $U(t_1) \cdot I(t_1)$ for FIGS. 2 and 3. As soon as the sum value S has reached a target value $S_{Soll}$, the current pulse is ended. The target value $S_{Soll}$ is specified by the glow plug controller 1 as a function of the variable of the desired heating output. The glow plug controller 1 comprises a memory, in which a program is stored that carries out the method described during operation.

In the exemplary embodiment illustrated in FIG. 1, the supply voltage that is present at the heating element R on a time average during the voltage pulse is higher than the supply voltage at a point in time $t_0$ prior to the start of the voltage pulse. Therefore, if a pulse duration, with which an energy quantity corresponding to the target value is fed into the heating element, were to be calculated on the basis of the vehicle electrical system voltage available at the point in time $t_0$, the pulse duration obtained would be too long. In FIGS. 2 to 3, the pulse duration calculated on the basis of the vehicle electrical system voltage available at the point in time $t_o$ is indicated by the point in time $t_e$. The point in time $t_e$ is considerably later than the point in time $t_n$, at which the sum value has already reached the specified target value and therefore the voltage pulse has been ended. The voltage pulse is therefore shorter by the time period $t_d$ than would have been expected on the basis of the vehicle electrical system voltage available at the point in time $t_0$ prior to the start of the voltage pulse.

In this way, the method described can be used to calculate the anticipated pulse duration of a voltage pulse even before the pulse starts. After each measurement process of the voltage and the current, the sum value is updated. Based on the sum value, a remaining difference with respect to the target value can be determined and thereby an anticipated pulse duration can be corrected.

In the illustrated exemplary embodiment, current values and voltage values are measured at intervals of 125 microseconds. The period of the pulse width modulation, this being the duration of the time interval during which the switch S is actuated twice, is 15 milliseconds to 30 milliseconds, for example.

REFERENCE NUMERALS

1 Glow plug controller
2 Control line
3 Signal line
4 Signal line
5 Switch
I Current
U Voltage
S Sum value
R Heating element
t Time

What is claimed is:

1. A method for operating a heating element in a motor vehicle by pulse width modulation, with fluctuations in the supply voltage being compensated for by adapting the duty cycle so as to achieve a desired heating output, the method comprising:

measuring voltage present at the heating element and/or the current flowing through the heating element at specified intervals during a voltage pulse;

adding the measured values, or values determined therefrom, to calculate a sum value, the sum value rising with energy fed into the heating element by the voltage pulse; and ending the voltage pulse at the latest when the sum value has reached a target value.

2. The method according to claim 1, wherein the sum value is determined by measuring the voltage that is present at the heating element and adding the measured voltage values.

3. The method according to claim 1, wherein the sum value is determined by measuring the voltage that is present at the heating element and adding the squares of the measured voltage values.

4. The method according to claim 1, wherein the sum value is determined by measuring the current flowing through the heating element and adding the measured current values.

5. The method according to claim 1, wherein the sum value is determined by measuring the current flowing through the heating element and adding the squares of the measured current values.

6. The method according to claim 1, wherein both the voltage that is present at the heating element and the current flowing through the heating element are measured at specified intervals, the sum value is calculated as the integral of the product formed of current and voltage over time by multiplying each measured voltage value with a measured current value and adding the products obtained by these multiplications.

7. A method according to claim 1, wherein the heating element is a glow plug.

8. A method according to claim 1, wherein the voltage that is present at the heating element and/or the current flowing through the heating element are measured at least 10 times during a pulse.

9. A method according to claim 1, wherein the voltage that is present at the heating element and/or the current flowing through the heating element are measured at least 2 times, preferably at least 4 times, per millisecond.

10. A method according to claim 1, wherein a maximum pulse duration is specified for each pulse, and a pulse is ended as soon as either the sum value has reached the target value or the maximum pulse duration has been reached.

11. A method according to claim 1, wherein a voltage pulse is only ended when the sum value has reached the target value.

12. A method according to claim 1, wherein the target value is determined by a controller as a function of the variable of the desired heating output.

13. A glow plug controller, comprising a control output for actuating a switch, and at least one signal input for measuring a voltage (U) present at a glow plug or a current flowing through the heating element (R), wherein during operation the glow plug controller carries out the method according to claim 1.

* * * * *